(No Model.)
O. A. DARROW.
OIL SEPARATOR.
No. 569,016. Patented Oct. 6, 1896.
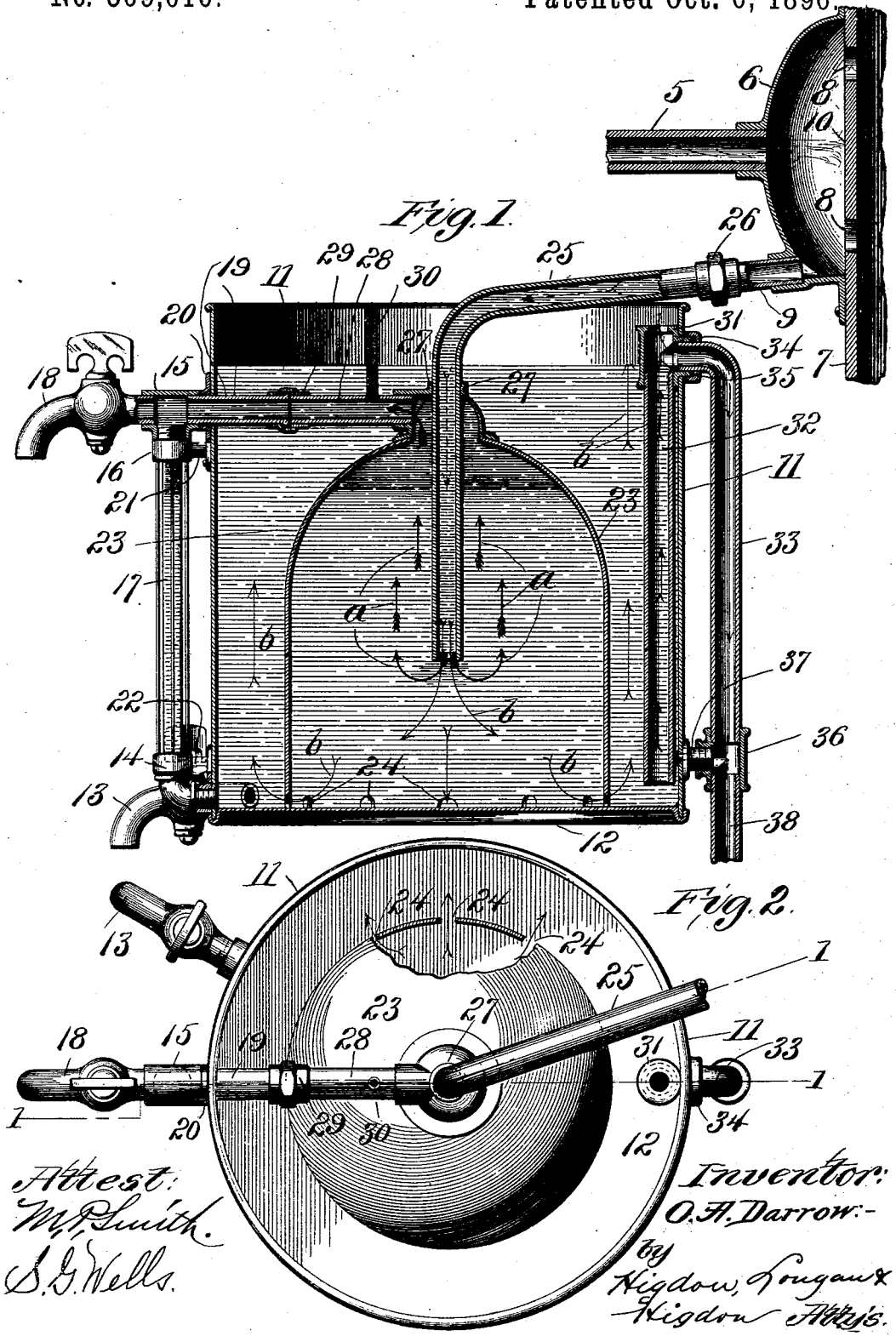

UNITED STATES PATENT OFFICE.

OLIVER A. DARROW, OF O'FALLON, ILLINOIS.

OIL-SEPARATOR.

SPECIFICATION forming part of Letters Patent No. 569,016, dated October 6, 1896.

Application filed July 20, 1896. Serial No. 599,952. (No model.)

*To all whom it may concern:*

Be it known that I, OLIVER A. DARROW, of the city of O'Fallon, St. Clair county, State of Illinois, have invented certain new and useful Improvements in Oil-Separators, of which the following is a full, clear, and exact description, reference being had to the accompanying drawings, forming a part hereof.

My invention relates to oil-separators; and it consists in the novel construction, combination, and arrangement of parts hereinafter shown, described, and claimed.

Figure 1 is a vertical sectional view approximately through the center of my improved oil-separator, as indicated by the line 1 1 in Fig. 2. Fig. 2 is a top plan view of the device shown in Fig. 1, parts being broken away.

In the drawings I have shown a form of the device in connection with the heater or condenser which is usually used in connection with an engine. The exhaust-pipe 5, leading from the engine, is tapped into the chamber 6 of the heater, and said chamber 6 is attached to the casing 7. The openings 8, through the casing 7, lead from the chamber 6 to the interior of the heater, and the pipe 9 is tapped into the lower part of the chamber 6.

The exhaust from the engine, consisting of steam and oil, passes through the pipe 5 into the chamber 6 and against the outer surface 10 of the casing 7 of the heater, and said steam is somewhat condensed within the chamber 6, and the oil contained in said steam adheres to the inner walls of said chamber and to the surface 10, and by the force of gravity will pass downwardly into the lower part of the chamber 6, from whence it will pass through the pipe 9. The steam which is condensed into water within the chamber 6 will also pass through the pipe 9 with the oil, while the dry steam, which remains uncondensed, will pass through the openings 8 into the heater.

My device is intended to receive the oil and water which passes through the pipe 9 and separate the oil from the water, depositing the oil in one receptacle and the water into another, and in the construction of this device I use a tank 11, having a flat bottom 12, and a faucet 13 is tapped into one side of the tank 11 immediately above the bottom 12.

A glass gage-seat 14 is tapped into one side of the tank 11 near the bottom thereof. A T-joint 15 is positioned near the top of the tank and in vertical alinement with the gage-seat 14 and has a gage-seat 16 in its lower end, and the glass gage 17 is placed between said gage-seats 14 and 16. A faucet 18 is tapped into one of the horizontal arms of the T-coupling 15, and a short pipe 19 is tapped into the opposite one of the horizontal arms of the T-coupling 15, and said pipe 19 is screw-seated in the bearing 20, which is attached to the tank 11, and said pipe 19 passes through the wall of said tank 11. An arm 21 projects from the gage-seat 16 and is attached to the wall of the tank 11, and a similar arm 22 projects from the gage-seat 14 and is also attached to the tank 11.

A bottomless cone-shaped can 23 is placed within the tank 11, and the lower end of said can rests directly upon the bottom 12 of said tank. A series of small notches 24 are made in the lower edge of the wall of the can and provide passage-ways from the interior of said can 23 to the space surrounding said can.

An elbow-pipe 25 is positioned with its lower end approximately in the center of said can 23, and the upper end of said pipe 25 is connected to the outer end of the pipe 9 by the union 26.

A tight joint is formed between the upper end 27 of the can 23 and the pipe 25. A pipe 28 is tapped into the upper end 27 of the can 23 and the outer end of said pipe 28 is connected to the pipe 19 by means of the union 29. A vent 30 projects upwardly from the pipe 28, thus providing a passage for the air from the interior of the can 23.

A T-joint 31 is positioned near the top of the tank 11 with its alined openings in a vertical position inside of said tank and its odd opening penetrating the wall of said tank. A pipe 32 is tapped into the lower one of the alined openings of said T-joint 31 and extends downwardly inside of the tank to a position near the bottom 12. An elbow-pipe 33 is tapped into the odd opening of said T-joint 31 and a cap 34 is placed upon said elbow. A packing-ring 35 is placed against the outer end of said opening and inside of said cap 34, and said cap 34 is screw-seated upon said T-joint, thus holding said T-joint securely in position and forming a tight joint between said T-joint and the wall of the tank.

A pipe-coupling 36 is attached to the lower end of the elbow-pipe 33, and an arm 37 connects said coupling to the tank 11 and forms a support for the pipe. A pipe 38 is screw-seated in the lower end of the coupling 36 and leads to a cistern, sewer, or other receptacle for the water which passes through the device.

In the practical operation of my improved oil-separator the water and oil from the condenser pass downwardly through the pipe 9, through the union 26, through the pipe 25, and into the can 23. The oil being lighter than the water will pass upwardly from the discharge end of the pipe 25, as indicated by the heavy arrows $a$, while the water will pass downwardly, as indicated by the lighter arrows $b$, and will settle in the bottom of the can 23, and from thence will pass outwardly through the notches 24 into the space surrounding said can 23 and within the tank 11. As the water rises in the tank 11 it will also rise in the pipe 32 until it reaches a point within said tank above the level of the opening in the upper end of the pipe 33, when said water will pass outwardly and downwardly through said pipe to the sewer, cistern, or other receptacle designed to receive it. The opening in the upper end of the T-joint 31 provides an air-vent and prevents the pipes 32 and 33 from acting as siphons and emptying the tank. As the water rises within the can 23 the air in said can is forced upwardly and passes out through the vent 30. As the water rises within the tank 11 and the can 23 and the pipe 32 it will also rise in the glass gage 17. The oil which rises within the can 23 will be collected in the top of said can and may be drawn off through the pipe 28 by means of the faucet 18. The dark shading indicates the oil and the light shading indicates the water. The oil will overflow from the can 23 through the pipe 28 and into the glass gage 17 and will seek its level, and the amount of oil within said can 23 may be determined by an examination of the gage. When the faucet 18 is open, the pressure of the water within the tank 11 outside of the can 23 will force the oil within said can 23 upwardly and outwardly through the pipe 28 until said oil is exhausted. Then by closing said faucet oil will again accumulate within said can, as before. The dirty water may be drawn from the tank through the faucet 13.

While I have shown and described my invention in connection with the exhaust-pipe of an engine and the heater and condenser, it is obvious that it may be used in connection with any device or mechanism from which a mixture of oil and water may be taken.

The device may be used at the discharge end of a heater and all the water caused by condensation within said heater, as well as the oil, may be passed through the separator, or the separator may be used anywhere that a mixture of oil and water may be obtained to be run through said separator, and the size and form of the device may be changed to suit the varying conditions under which it is to be used without departing from the spirit of my invention.

I claim—

1. In a device of the class described, a tank, a receptacle within said tank having an open bottom and a closed top, an inlet-pipe leading to the interior of said receptacle, an outlet-pipe leading from the top of said receptacle, a faucet controlling the flow from said pipe, a pipe positioned with its lower open end within said tank and near the bottom thereof, and a connection with the upper end of said pipe forming a passage through the wall of said tank, substantially as specified.

2. In a device of the class described, a tank, a receptacle within said tank having an open bottom and a closed top, an inlet-pipe leading to the interior of said receptacle, an outlet-pipe leading from the top of said receptacle, a faucet controlling the flow from said pipe, a vent in said outlet pipe and projecting upwardly therefrom, a pipe positioned with its lower open end within said tank and near the bottom thereof, and a connection with the upper end of said pipe forming a passage through the wall of said tank, substantially as specified.

3. In a device of the class described, a tank, a receptacle within said tank having an open bottom and a closed top, an inlet-pipe leading to the interior of said receptacle, an outlet-pipe leading from the top of said receptacle, a pipe positioned with its lower open end within said tank and near the bottom thereof, a connection with the upper end of said pipe forming a passage through the wall of said tank, and a drain-pipe leading from said passage, substantially as specified.

4. In a device of the class described, a tank, a receptacle within said tank having an open bottom and a closed top, an inlet-pipe leading to the interior of said receptacle, an outlet-pipe leading from the top of said receptacle, a faucet controlling the flow from said pipe, a vent in said outlet-pipe and projecting upwardly therefrom, a pipe positioned with its lower open end within said tank and near the bottom thereof, a connection with the upper end of said pipe forming a passage through the wall of said tank, and a drain-pipe leading from said passage, substantially as specified.

5. In a device of the class described, a tank, a receptacle within said tank having an open bottom and a closed top, an inlet-pipe leading to the interior of said receptacle, an outlet-pipe leading from the top of said receptacle, a faucet controlling the flow from said pipe, a vent in said outlet-pipe and projecting upwardly therefrom, a pipe positioned with its lower open end within said tank and near the bottom thereof, a connection with the upper end of said pipe forming a passage through the wall of said tank, a drain-pipe leading from said passage, and a glass gage connected with said tank, substantially as specified.

6. In a device of the class described, a tank, a receptacle within said tank having an open bottom and a closed top, an inlet-pipe leading to the interior of said receptacle, an outlet-pipe leading from the top of said receptacle, a faucet controlling the flow from said pipe, a vent in said outlet-pipe and projecting upwardly therefrom, a pipe positioned with its lower open end within said tank and near the bottom thereof, a connection with the upper end of said pipe forming a passage through the wall of said tank, a drain-pipe leading from said passage, and a faucet in the bottom of said tank, substantially as specified.

In testimony whereof I affix my signature in presence of two witnesses.

OLIVER A. DARROW.

Witnesses:
H. H. MUNIER,
D. B. UMBARGER.